(12) United States Patent
Katchmart et al.

(10) Patent No.: US 11,967,341 B1
(45) Date of Patent: Apr. 23, 2024

(54) WRITE SIGNAL INTERFERENCE CANCELLATION ACROSS DATA/SERVO CLOCK BOUNDARY

(71) Applicant: Marvell Asia Pte Ltd, Singapore (SG)

(72) Inventors: Supaket Katchmart, San Jose, CA (US); Mats Oberg, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/344,472

(22) Filed: Jun. 29, 2023

Related U.S. Application Data

(60) Provisional application No. 63/392,185, filed on Jul. 26, 2022.

(51) Int. Cl.
*G11B 5/00* (2006.01)
*G11B 5/012* (2006.01)
*G11B 20/10* (2006.01)

(52) U.S. Cl.
CPC ........ *G11B 20/10009* (2013.01); *G11B 5/012* (2013.01)

(58) Field of Classification Search
CPC ..... G11B 20/10009; G11B 5/09; G11B 20/10; G11B 20/10212; G11B 20/10222; G11B 5/00
USPC .................................. 360/32, 39, 45, 51, 55
See application file for complete search history.

(56) References Cited

U.S. PATENT DOCUMENTS 8,379,498 B2 * 2/2013 Mathew ........... G11B 20/10046
369/47.28

* cited by examiner

*Primary Examiner* — Nabil Z Hindi

(57) ABSTRACT

A method for cancelling, from servo signals read in a read channel while a write channel is active, interference caused by write signals in the write channel, includes generating a predicted channel response signal from the write signals in a data clock domain, resampling the generated predicted channel response signal using a clock in the data clock domain having a rate corresponding to a servo clock from a servo clock domain, transferring the resampled predicted channel response signal from the data clock domain to the servo clock domain and aligning phase of the transferred resampled predicted channel response signal with phase of the servo clock, determining a domain-boundary-crossing delay incurred in the transferring, based on the domain-boundary-crossing delay, synchronizing the phase-aligned transferred resampled predicted channel response signal with the servo signals, and subtracting the synchronized phase-aligned transferred resampled predicted channel response signal from the servo signals.

20 Claims, 7 Drawing Sheets

WRITE SIGNAL INTERFERENCE CANCELLATION ACROSS DATA/SERVO CLOCK BOUNDARY

CROSS REFERENCE TO RELATED APPLICATION

This disclosure claims the benefit of, commonly-assigned U.S. Provisional Patent Application No. 63/392,185, filed Jul. 26, 2022, which is hereby incorporated by reference herein in its entirety.

FIELD OF USE

This disclosure relates to increasing the space available for writing on a disk drive medium by cancelling interference that is caused by write signals and that affects servo read operations. More particularly, this disclosure relates to adjusting the phase of a write interference cancellation signal across the boundary between the data clock domain and the servo clock domain.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

In order to control the radial position selected by the actuator, each surface of each platter has distributed upon it positional information referred to as "servo" data. The servo data is commonly distributed in spaced-apart servo "wedges" (generally spaced equiangularly) on the platter surface. By reading the servo data as each servo wedge passes under the read head, the disk drive controller can determine the precise radial (and angular) position of the head and can feed back that determination to control the position of the read head or the write head, depending on the required operation.

In order to maintain accurate head positioning during read and write operations, servo data is read each time a read head encounters a servo wedge (i.e., multiple times per disk rotation) during any read operation or write operation. Because the magnetic field needed for write operations could interfere with the servo read operation, any write operations that may be in progress typically are stopped for the duration of any servo read operation. And because the write head typically follows the read head in the tangential direction, stopping of write operations to prevent interference with servo read operations results in a data-free wedge adjacent each servo wedge, which wastes disk medium space.

SUMMARY

In accordance with implementations of the subject matter of this disclosure, a method for cancelling, from servo signals read in a read channel while a write channel is active, interference caused by write signals in the write channel, includes generating a predicted channel response signal from the write signals in a data clock domain, resampling the generated predicted channel response signal using a clock in the data clock domain having a rate corresponding to a servo clock from a servo clock domain, transferring the resampled predicted channel response signal from the data clock domain to the servo clock domain and aligning phase of the transferred resampled predicted channel response signal with phase of the servo clock, determining a domain-boundary-crossing delay incurred in the transferring, based on the domain-boundary-crossing delay, synchronizing the phase-aligned transferred resampled predicted channel response signal with the servo signals, and subtracting the synchronized phase-aligned transferred resampled predicted channel response signal from the servo signals.

In a first implementation of such a method, the resampling the generated predicted channel response signal may include starting the resampling based on a start signal on a rising edge of a data clock of the data clock domain.

According to a first aspect of that first implementation, the transferring the resampled predicted channel response signal from the data clock domain to the servo clock domain and the aligning the phase of the transferred resampled predicted channel response signal with phase of the servo clock may include clocking the resampled predicted channel response signal into a buffer using the data clock and clocking the resampled predicted channel response signal out of the buffer using the servo clock.

In a first instance of that first aspect, clocking the resampled predicted channel response signal into a buffer and clocking the resampled predicted channel response signal out of the buffer may include clocking the resampled predicted channel response signal into a FIFO buffer and clocking the resampled predicted channel response signal out of the FIFO buffer.

According to a second aspect of the first implementation, determining the domain-boundary-crossing delay incurred in the transferring may include passing the start signal through domain-boundary-crossing synchronization circuitry, and measuring elapsed time between a rising edge of the start signal immediately prior to the domain-boundary-crossing synchronization circuitry and a rising edge of the start signal immediately following the domain-boundary-crossing synchronization circuitry.

In a second implementation of such a method, synchronizing the phase-aligned transferred resampled predicted channel response signal with the servo signals based on the domain-boundary-crossing delay may include adding to the domain-boundary-crossing delay an additional delay, and a sum of the domain-boundary-crossing delay and the additional delay may be equal to a sum of transit time of the write signals to a point where the interference is caused and transit time of the servo signals after the interference is caused to a point where the subtracting occurs.

According to a first aspect of that second implementation, adding to the domain-boundary-crossing delay an additional delay may include adding an additional delay equal to a non-integral number of clock periods.

In a first instance of that first aspect, adding an additional delay equal to a non-integral number of clock periods may include separately adding an integral number of clock periods and a phase adjustment.

In a first alternative of that first instance, adding an integral number of clock periods may include adding a number of pipeline stages.

In a second alternative of that first instance, adding a phase adjustment may include interpolating the phase.

In accordance with implementations of the subject matter of this disclosure, a controller for a storage device including a rotatable storage medium on which servo data is written to control read/write head positioning includes control circuitry for cancelling, from servo signals read in a read channel while a write channel is active, interference caused by write signals in the write channel, the control circuitry including a reconstruction filter configured to generate a predicted channel response signal from the write signals in a data clock domain, a resample circuit configured to resample the generated predicted channel response signal using a clock in the data clock domain having a rate corresponding to a servo clock from a servo clock domain, transfer circuitry configured to transfer the resampled predicted channel response signal from the data clock domain to the servo clock domain and to align phase of the transferred resampled predicted channel response signal with phase of the servo clock, clock domain synchronization circuitry configured to determine a domain-boundary-crossing delay incurred in the transfer circuitry, variable delay circuitry configured to, based on the domain-boundary-crossing delay, synchronize the phase-aligned transferred resampled predicted channel response signal with the servo signals, and combining circuitry configured to subtract the synchronized phase-aligned transferred resampled predicted channel response signal from the servo signals.

In a first implementation of such a controller, the resample circuit may be configured to start resampling based on a start signal on a rising edge of a data clock of the data clock domain.

According to a first aspect of that first implementation, the transfer circuitry may include a buffer into which the resampled predicted channel response signal is clocked using the data clock and out of which the resampled predicted channel response signal is clocked using the servo clock.

In a first instance of that first aspect, the buffer may include a FIFO buffer.

According to a second aspect of that first implementation, the clock domain synchronization circuitry may be configured to pass the start signal through domain-boundary-crossing synchronization circuitry, and measure elapsed time between a rising edge of the start signal immediately prior to the domain-boundary-crossing synchronization circuitry and a rising edge of the start signal immediately following the domain-boundary-crossing synchronization circuitry.

In a second implementation of such a controller, the variable delay circuitry may be configured to add to the domain-boundary-crossing delay an additional delay, a sum of the domain-boundary-crossing delay and the additional delay being equal to a sum of transit time of the write signals to a point where the interference is caused and transit time of the servo signals after the interference is caused to the combining circuitry.

According to a first aspect of that second implementation, the variable delay circuitry may be configured to add to the domain-boundary-crossing delay an additional delay equal to a non-integral number of clock periods.

In a first instance of that first aspect, the variable delay circuitry may be configured to add to the domain-boundary-crossing delay an additional delay equal to an integral number of clock periods and a phase adjustment.

In a first alternative of that first instance, the variable delay circuitry may be configured to add an integral number of clock periods by adding a number of pipeline stages.

In a second alternative of that first instance, the variable delay circuitry may be configured to add a phase adjustment by interpolating the phase.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
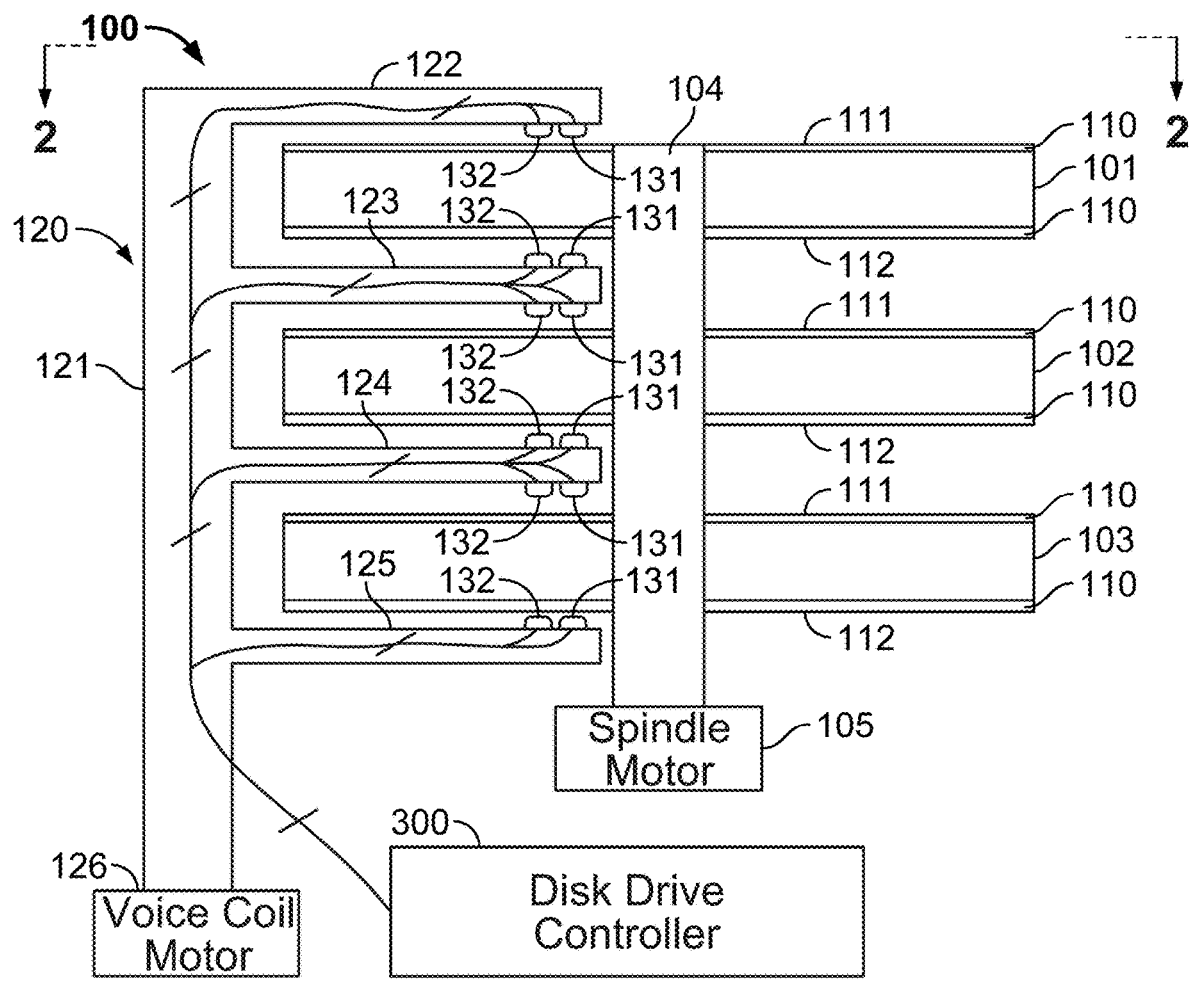
FIGS. 1 and 2 show an example of a disk drive 100 with which the subject matter of the present disclosure may be used.

As noted above, stopping of write operations to prevent interference with servo read operations results in a data-free wedge adjacent each servo wedge, because when the read head encounters the near boundary of a servo wedge, the write head, which is still spaced away from that boundary, must stop writing until the read head clears the far boundary of the servo wedge. If the spacing between the read head and the write head is equal to or smaller than the width of the servo wedge, that would mean that when the read head clears the far boundary of the servo wedge, the write head will already be within the servo wedge and will not have started writing again before reaching entering the servo wedge. In such a case, there will be a blank wedge directly adjacent—i.e., abutting—the servo wedge, having a width equal to the head-to-head spacing.

Alternatively, although less likely, if the spacing between the read head and the write head is larger than the width of the servo wedge, that would mean that when the read head clears the far boundary of the servo wedge, the write head will not yet have reached the near boundary of the servo wedge and will start writing again before reaching the near boundary of the servo wedge. In such a case, there will be a blank wedge, having a width equal to the width of the servo wedge, adjacent to the servo wedge but spaced away from the servo wedge by a distance equal to the difference between the head-to-head spacing and the width of the servo wedge.

In either case, it would be desirable to be able to continue writing as long as the write head is outside the servo wedge, even as the read head is reading servo data from the servo wedge. To allow writing to continue while the read head is reading servo data from the servo wedge would require being able to cancel, from the read channel, interference caused by the write signal. Both analog and digital techniques are available to determine or estimate the interference caused by the write signal. However, the analog techniques may not be practical, because the analog techniques typically require a large analog circuit that occupies substantial circuit area and consumes substantial amounts of power.

Although digital techniques are available, the generation of the interference signal (and the correction signal) occurs in the data clock domain while the correction is to be applied in the servo clock domain. The data clock and servo clock not only may have different rates or frequencies but also may be asynchronous, and the phase difference between the two clocks may not be predictable. Moreover, the write operation could occur close in time to the servo operation, leaving insufficient time before the servo operation to determine the phase of the interference signal or the correction signal.

Therefore, in accordance with implementations of the subject matter of this disclosure, a write interference cancellation signal can be determined digitally in the data clock domain and transferred to the servo clock domain. The phase of the write interference cancellation signal can be adjusted in the servo clock domain to align with the servo read signal to cancel the write signal interference, thereby allowing writing to continue even while a servo read operation is in progress. As a result, unused disk medium area can be minimized or eliminated.

The write signal is generated digitally, or received in the digital domain, and then is written to the disk medium via the analog read/write channel which may include an analog front end, a preamplifier, and write head circuitry. If servo reading is also occurring, some or all of the write data signal may couple to the servo signal being read, which passes back through an analog front end and then may be digitized for use by disk drive controller to position the read and write heads. Because write data may be coupled to the servo signal, the servo signal may not accurately reflect the head position, and as a result, the drive controller may position the read and write heads inaccurately.

In order to filter out any portion of the write data signal that may couple to the servo signal being read, the write data signal portion—i.e., the write signal interference on the servo read channel—must first be determined. Any of various previously-known techniques may be used to derive the write signal interference. However it is determined, the write signal interference is derived in the data clock domain, while the servo data from which the write signal interference is to be cancelled is in the servo clock domain. As noted above, not only might the servo clock rate or frequency be different from the data clock rate or frequency, but the servo clock also may be asynchronous to the data clock rate or frequency, so the phase of the servo clock is likely to be different from the phase of the data clock (although by happenstance the phases may be the same in some cases), and the phase difference is generally not predictable.

In accordance with implementations of the subject matter of this disclosure, the write signal interference can be converted to an interference cancellation signal in the data clock domain, which may then be transferred to the servo clock domain. The interference cancellation signal is then aligned with the servo data as read, which includes the interference coupled from the write head to the read head, which is to be cancelled. In order for the cancellation to be effective, the interference cancellation signal must meet up with the actual analog servo read signal (incorporating the interference), after digitization of the read signal, at the correct time and phase.

The time for passage of the analog write signal from generation of the analog write signal, through the analog write channel including an analog front end, preamplifier circuitry, and the actual write head onto the disk, then through the read head, and the read channel including its analog front end, can be known (measured or calculated). Similarly, the time for digitization of the servo read signal can be known (measured or calculated).

Similarly, the time needed to derive the interference cancellation signal can be determined. Once the time-domain crossing delay has been determined, any further delay needed to match up with the sum of the analog write and read channel delay and the servo read digitization delay can be adjusted so that the interference cancellation signal is aligned with the servo signal, which includes the interference to be cancelled.

The subject matter of this disclosure may be better understood by reference to FIGS. 1-8.

Figure 2:
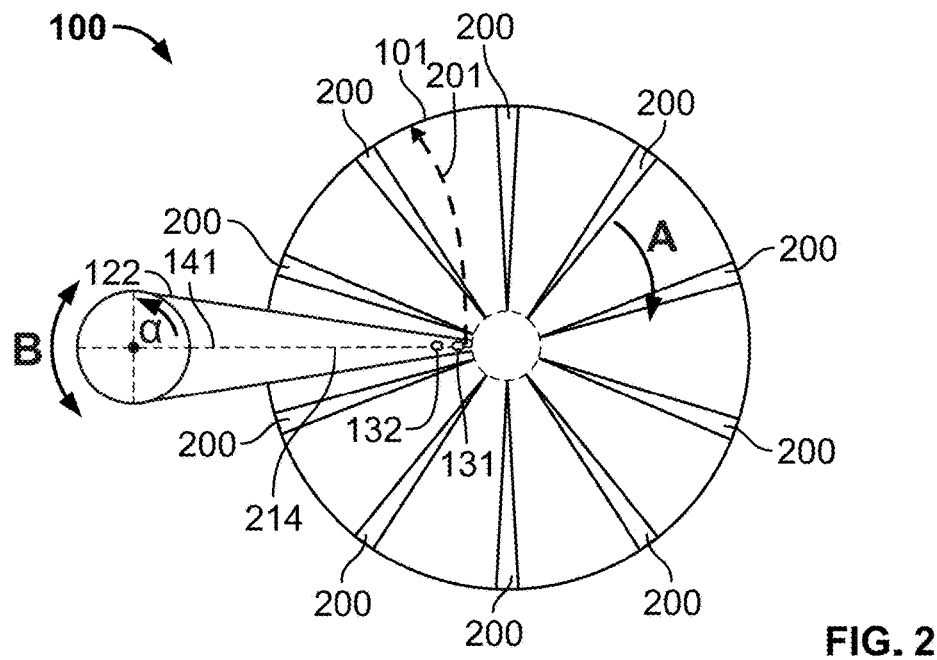

FIGS. 1 and 2 show an example of a disk drive 100 with which the subject matter of the present disclosure may be used. In this particular example, disk drive 100 has three platters 101, 102, 103, although any number of platters may be included in a disk drive with which the subject matter of the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Spindle motor 105 rotates spindle 104 to rotate platters 101-103 in the direction of arrow A (FIG. 2). Although spindle motor 105 is shown connected directly to spindle 104, in some cases spindle motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two heads 131, 132 are shown, and may represent, respectively, read and write heads, although it in some applications each arm 123, 124 may bear more than one read head/sensor and more than one write head (not shown). In the configuration shown in FIGS. 1 and 2, arms 122-125 are aligned along a radius of platters 101-103, bringing heads 131, 132 as close as they can get to spindle 104. It should be noted that FIGS. 1 and 2 are schematic only and not to scale. Normally, the spindle diameter would be larger relative to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the heads 131, 132 along the path indicated by dashed arrow 201. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes data identifying it by wedge index, track index, or sector number (to give an angular, tangential or circumferential position) and by data representing, at each point along a radius of the platter, the distance from spindle 104. Typical servo wedges are wedge-shaped as the name suggests, and as shown in FIG. 2 (in some "constant density" systems, servo wedges 200 may have the same width at every radius—i.e., the same arc-length at every track).

Figure 3:
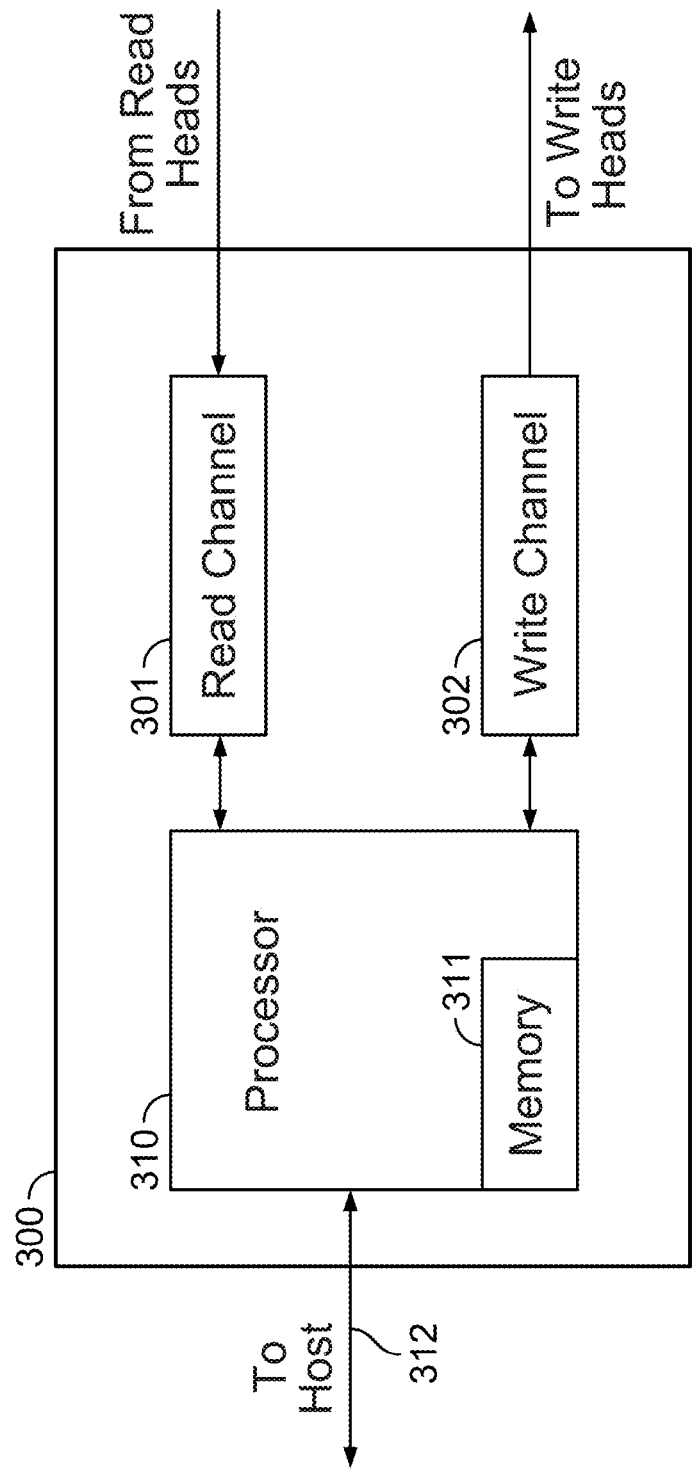
FIG. 3 is a diagram of a hard drive controller that may be used in a disk drive as in FIGS. 1 and 2 in implementations of the subject matter of this disclosure.

Each of read heads 131 is connected to a read channel 301 of a hard drive controller 300, just as each of write heads 123 is connected to a write channel 302 (FIG. 3). Hard drive controller 300 also includes a processor 310 and memory 311, as well as a connection 312 to a host processor (not shown). During normal disk operation, memory 311 may be used to store position error sensor (PES) data that indicates track position offsets. A servo control loop in hard drive controller 300 uses the PES data and the servo wedge data to keep the heads 131, 132 on track.

As noted above, read and write heads 131, 132 periodically encounter multiple servo wedges 200, performing multiple servo read operations during each disk revolution. Typically, in order to avoid writing interference with any of those periodic servo read operations, any write operation that may be in progress is suspended when a read head 131 encounter a servo wedge 200.

Figure 4:
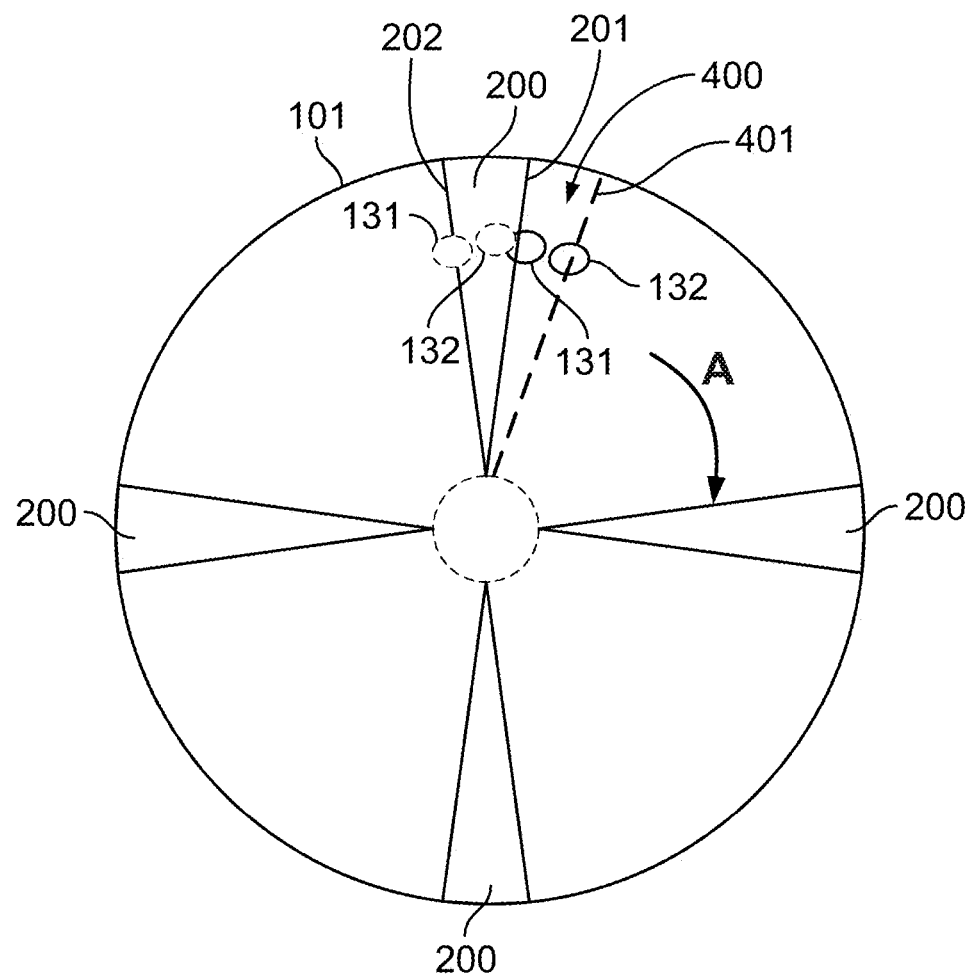
FIG. 4 is a graphic representation of a first situation in which there is no writing to particular area of a disk storage medium during a servo read operation, according to some implementations of the subject matter of this disclosure.

FIG. 4 shows an example where the distance between a read head 131 and a write head 132 is less than the width of a servo wedge 200. In this example, there are only four servo wedges 200 on the disk 101, but in reality the number of servo wedges 200 on a disk 101 may be much larger. As shown in solid lines, read head 131 has just reached the leading edge 201 of servo wedge 200, with write head 132 at line 401. As shown in broken lines, read head 131 has just reached the trailing edge 202 of servo wedge 200, with write head 132 within servo wedge 200. Any write operation typically would be suspended between those two positions. Insofar as writing would not be performed within servo wedge 200 in any case, the area that is not written to because of the suspension is the area 400 between line 401 and leading edge 201 of servo wedge 200.

Figure 5:
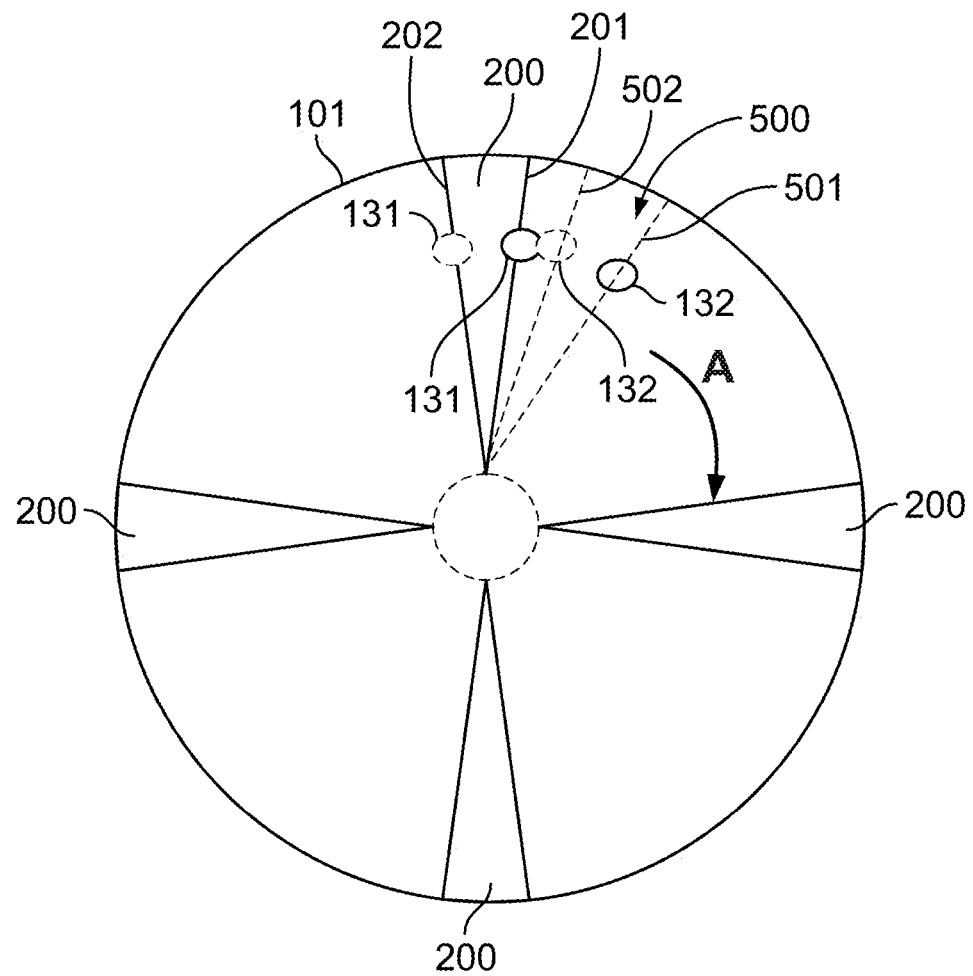
FIG. 5 is a graphic representation of a second situation in which there is no writing to particular area of a disk storage medium during a servo read operation, according to other implementations of the subject matter of this disclosure.

Most commonly, the distance between read head 131 and write head 132 will be less than the width of servo wedge 200 as in FIG. 4, but FIG. 5 shows an example where the distance between read head 131 and write head 132 is greater than the width of a servo wedge 200. As shown in solid lines, read head 131 has just reached the leading edge 201 of servo wedge 200, with the write head at line 501. As shown in broken lines, read head 131 has just reached the trailing edge 202 of servo wedge 200 with the write head at line 501. Any write operation typically would be suspended between those two positions. In this case, the area that is not written to because of the suspension is the area 500 between line 501, corresponding to the position of write head 132 when read head 131 encounters leading edge 201 of servo wedge 200, and line 502 corresponding to the position of write head 132 when read head 131 encounters trailing edge 202 of servo wedge 200.

Implementations of the subject matter of this disclosure allow write operations to continue even during servo read operations (except when write head 132 is within servo wedge 200), effectively increasing the usable size of disk 101 by the aggregate of all areas 400, 500 on disk 101.

Figure 6:
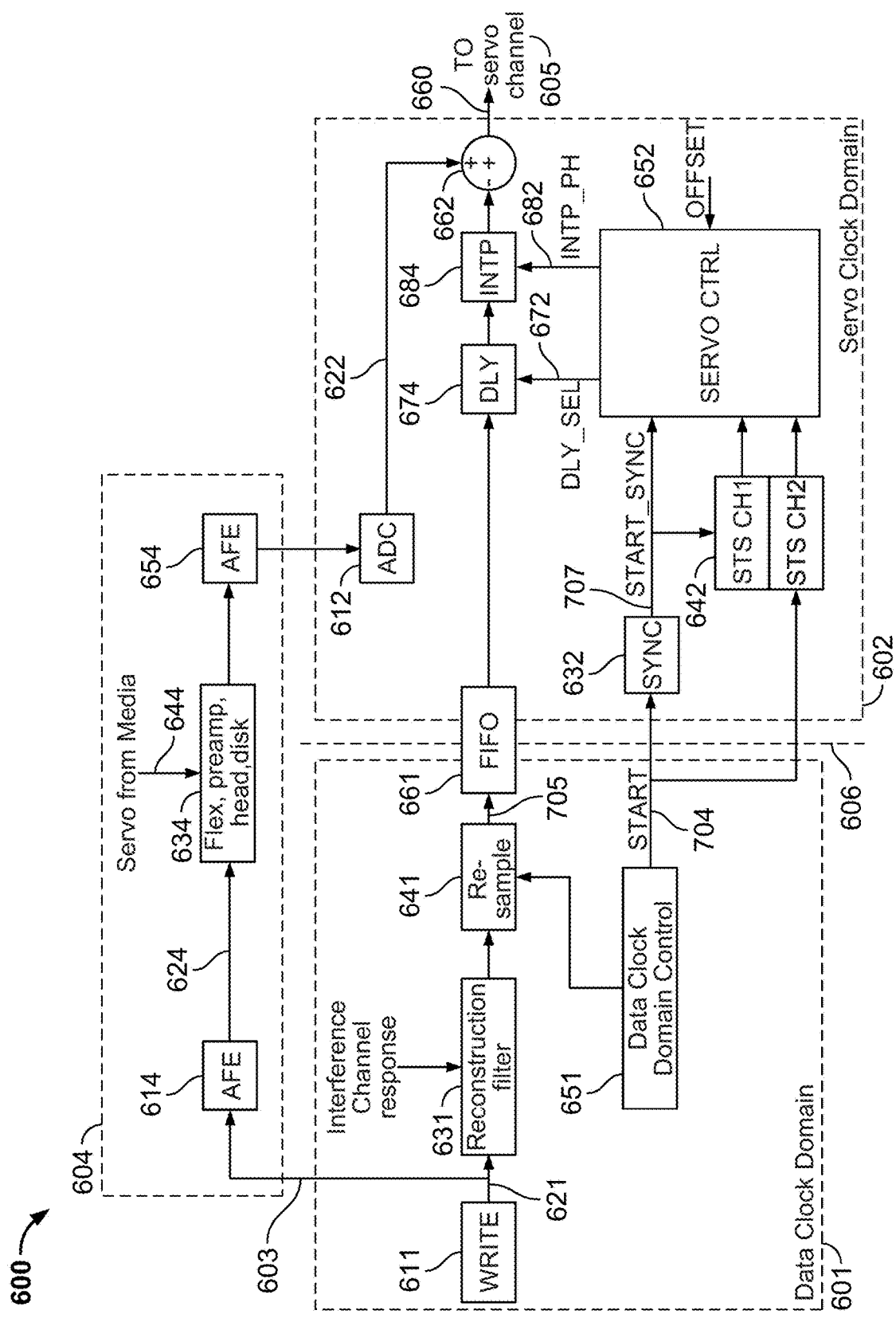
FIG. 6 is a schematic representation of a circuit architecture for determining a write interference cancellation signal in a data clock domain and transferring the signal across a clock domain boundary into a servo clock domain, according to implementations of the subject matter of this disclosure.

FIG. 6 shows, schematically, the architecture of circuitry 600 for determining the write interference cancellation signal in the data clock domain 601 and transferring it into the servo clock domain 602, where the write interference cancellation signal is combined with the servo read signal 622 that is corrupted by write interference, to recover a clean servo read signal 660.

Write data to be written is generated or received digitally at 611. The digital data 621 is transferred at 603 to analog path 604 including analog front end 614 which converts digital data 621 to analog signal 624 and equalizes analog signal 624. Equalized data signal 624 propagates to write head 132 at 634 for writing to disk 101. At the same time, read head 131 may be reading servo data 644, which passes through another analog front end 654, and is digitized by analog-to digital converter 612 in servo clock domain 602, for controlling head position via servo channel 605. However, digitized servo data 622 is corrupted by interference from write signal 624.

Figure 7:
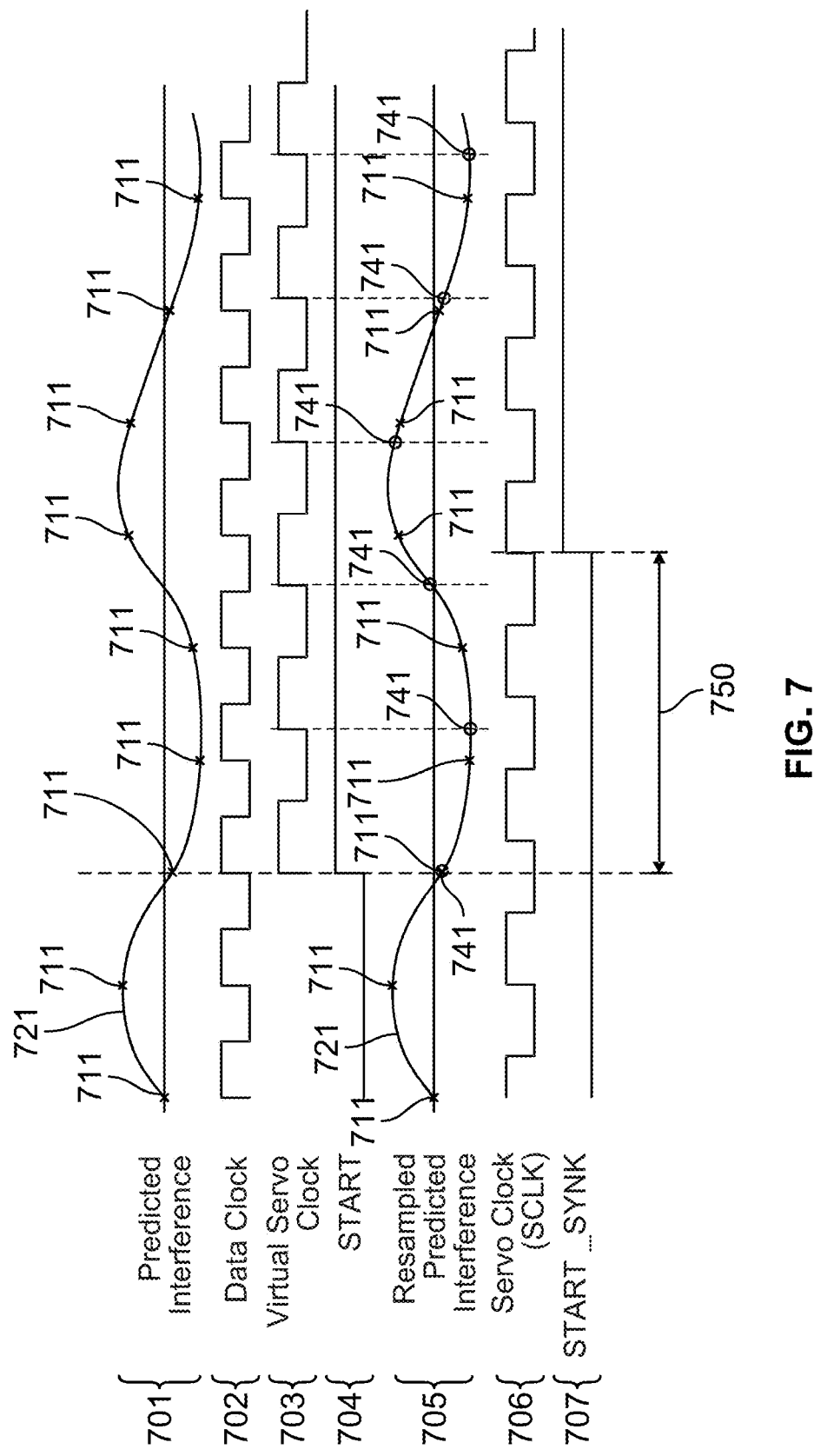
FIG. 7 is a timing diagram illustrating operation of implementations of the subject matter of this disclosure.

In parallel with the operations discussed in the preceding paragraph, reconstruction filter 631 derives from write signal 621 the interference response that will be caused in servo data 622 by the presence of write signal 624. As seen in FIG. 7, interference response 701 includes a plurality of digital samples 711 representing a digitized version of predicted analog interference waveform 721. Samples 711 are determined at rising edges of data clock 702.

In order for interference response 701 to be used in servo clock domain 602, it is first converted by resample circuit 641 to a clock rate matching the rate of the servo clock 706, which is known in data clock domain 601, even though the phase of the servo clock 706 is unknown in data clock domain 601. Clock signal 703, which is started by START signal 704 that is asserted on a rising edge of data clock 702 by data clock domain control circuit 651, and runs at rate of the servo clock 706, may be referred to as a virtual servo clock and is used to control the resampling of interference response 701 in resample circuit 641, generating resampled response 705 including resampled samples 741. Each resampled sample 741 is generated on a rising edge of virtual servo clock 703 and, like samples 711, resampled samples 741 are intended to approximate predicted analog interference waveform 721. However, only samples 711 are available with which to generate resampled samples 741. Resampled samples 741 may be interpolated from the nearest samples 711 using, e.g., linear or higher-order (such as cubic) interpolation. While a higher-order interpolation may more accurately represent predicted analog interference waveform 721, linear interpolation is more straightforward, and easier to implement.

As generated in resample circuit 641, resampled interference samples 741 match the rate of servo clock 706 of servo clock domain 602, but not the phase of servo clock 706. Resampled interference samples 741 are then transported across the clock domain boundary 606 between data clock domain 601 and servo clock domain 602 via FIFO 661. Resampled interference samples 741 are clocked into FIFO 661 by data clock 702 or, more likely, virtual servo clock 703, and are clocked out of FIFO 661 by servo clock 705. Resampled interference samples 741 are then fully within servo clock domain 602, but the time delay 750 in FIFO 661 cannot be known because servo clock 705 is completely asynchronous with either data clock 702 or virtual servo clock 703. But in order to line up the resampled interference samples 741 with the digitized servo data 622 from which interference is to be cancelled, the time delay 750 in FIFO 661 must be determined.

The time delay 750 in FIFO 661 may be determined by transferring START signal 704 across the clock domain boundary through SYNC circuit 632, which may be a known synchronization circuit that outputs START_SYNC signal 707, aligned with servo clock 706, after an unpredictable number of clock cycles based on when the output of SYNC circuit 632 becomes stable. For example, if SYNC circuit 632 is based on a chain of flip-flops, then if START signal 704 arrives far from a rising clock edge of servo clock 706, the output will be stable after a smaller number of clock cycles, as compared to a larger number of clock cycles that would be required if START signal 704 were to arrive close to a rising clock edge of servo clock 706.

Servo timestamp circuit 642 may apply timestamps, with resolution less than one clock cycle, to both START signal 704 and START_SYNC signal 707, allowing servo control circuit 652 to determine the time delay 750 in FIFO 661, as the difference between those timestamps.

As noted above, the total time delay from write data generation 611 through analog path 604 (including read/write heads 634) to combining circuit (adder/subtractor) 662 is known. Similarly, the time delay from write data generation 611 through reconstruction filter 631 and resampling circuit 641 is known. The time delay 750 in FIFO 661, once determined, may be added to the time delay from write data generation 611 through reconstruction filter 631 and resampling circuit 641 for a total digital time delay that may be subtracted from the delay through analog path 604 (including read/write heads 634) to combining circuit (adder/subtractor) 662. Once that subtraction has been performed, servo control circuit 652 can add additional delay equal to the resulting difference, so that the sum of the total digital time delay and the additional delay is equal to the time delay from write data generation 611 through analog path 604 (including read/write heads 634) to combining circuit (adder/subtractor) 662.

The additional delay as determined by servo control circuit 652 may not be an integral number of clock cycles. Therefore, servo control circuit 652 may output a delay select (DLY_SEL) signal 672 representing the number of integral clock cycles—i.e., the integer portion—of the additional delay, and an interpolated phase (INTP_PH) signal 682 representing the additional fraction of a cycle—i.e., the fractional portion—of the additional delay.

Delay select signal 672 may be used to control delay circuit 674 to add the integer portion of the additional delay. For example, delay circuit 674 maybe a variable register pipeline in which the number of registers through which the resampled interference cancellation samples 741 passes may be selectable, with one register added for each servo clock cycle in the integer portion of the additional delay. Interpolated phase signal 682 may be used to control phase interpolator 684 to add the fractional portion of the additional delay. Together, delay circuit 674 and phase interpolator 684 add the total additional delay, so that the total digital delay of the interference cancellation signal from write generation 611 to combining circuit 662 is equal to the total analog delay from write generation 611 through analog path 604 (including read/write heads 634) to combining circuit 662.

After the interference cancellation signal, once aligned, has been subtracted from the corrupted servo signal 622 at combining circuit 662, a clean servo signal 660 may be transferred to the drive controller 300 via servo channel 605 to control head positioning.

Figure 8:
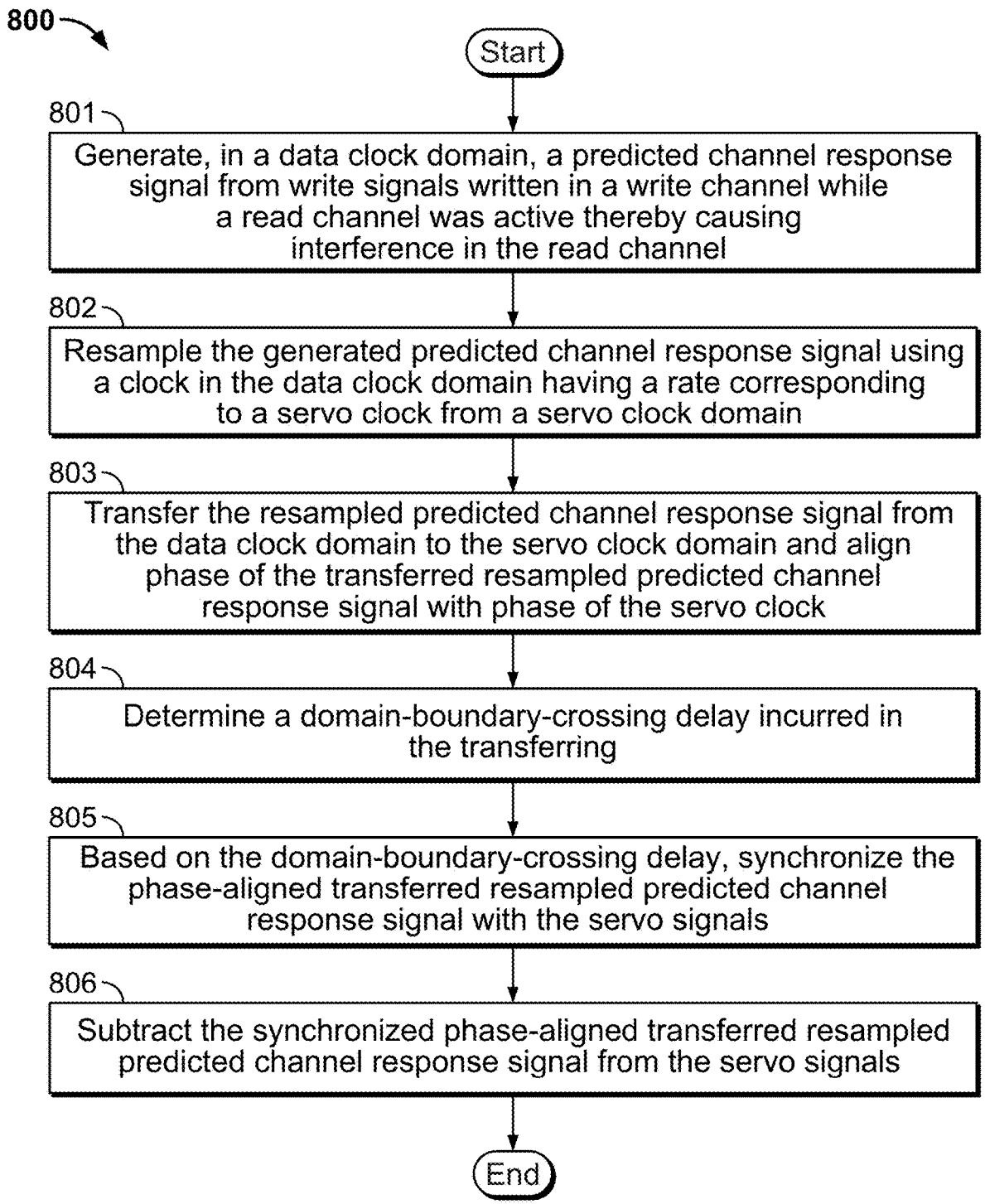
FIG. 8 is a flow diagram illustrating implementations of a method in accordance with the subject matter of this disclosure.

FIG. 8 is a flow diagram illustrating a method 800 in accordance with implementations of the subject matter of this disclosure for cancelling, from servo signals read in a read channel while a write channel is active, interference caused by write signals in the write channel. Method 800 begins at 801 where a predicted channel response signal is generated, in a data clock domain, from write signals written in a write channel while a read channel was active, thereby causing interference in the read channel. At 802, the generated predicted channel response signal is resampled using a clock in the data clock domain having a rate corresponding to a servo clock from a servo clock domain. At 803, the resampled predicted channel response signal is transferred from the data clock domain to the servo clock domain and the phase of the transferred resampled predicted channel response signal is aligned with the phase of the servo clock. At 804, a domain-boundary-crossing delay incurred in the transferring is determined. At 805, based on the domain-boundary-crossing delay, the phase-aligned transferred resampled predicted channel response signal is synchronized with the servo signals. At 806, the synchronized phase-aligned transferred resampled predicted channel response signal is subtracted from the servo signals. Method 800 then ends.

Thus it is seen that a method and apparatus for adjusting the phase of a write interference cancellation signal across the boundary between the data clock domain and the servo clock domain of a disk drive controller, thereby allowing writing to occur during servo read operations, to increase the space available for writing on a disk drive medium, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for cancelling, from servo signals read in a read channel while a write channel is active, interference caused by write signals in the write channel, the method comprising:
generating a predicted channel response signal from the write signals in a data clock domain;
resampling the generated predicted channel response signal using a clock in the data clock domain having a rate corresponding to a servo clock from a servo clock domain;
transferring the resampled predicted channel response signal from the data clock domain to the servo clock domain and aligning phase of the transferred resampled predicted channel response signal with phase of the servo clock;

determining a domain-boundary-crossing delay incurred in the transferring;

based on the domain-boundary-crossing delay, synchronizing the phase-aligned transferred resampled predicted channel response signal with the servo signals; and subtracting the synchronized phase-aligned transferred resampled predicted channel response signal from the servo signals.

2. The method of claim 1 wherein the resampling the generated predicted channel response signal comprises starting the resampling based on a start signal on a rising edge of a data clock of the data clock domain.

3. The method of claim 2 wherein the transferring the resampled predicted channel response signal from the data clock domain to the servo clock domain and the aligning the phase of the transferred resampled predicted channel response signal with phase of the servo clock comprise clocking the resampled predicted channel response signal into a buffer using the data clock and clocking the resampled predicted channel response signal out of the buffer using the servo clock.

4. The method of claim 3 wherein clocking the resampled predicted channel response signal into a buffer and clocking the resampled predicted channel response signal out of the buffer comprise clocking the resampled predicted channel response signal into a FIFO buffer and clocking the resampled predicted channel response signal out of the FIFO buffer.

5. The method of claim 2 wherein determining the domain-boundary-crossing delay incurred in the transferring comprises:

passing the start signal through domain-boundary-crossing synchronization circuitry; and measuring elapsed time between a rising edge of the start signal immediately prior to the domain-boundary-crossing synchronization circuitry and a rising edge of the start signal immediately following the domain-boundary-crossing synchronization circuitry.

6. The method of claim 1 wherein:

synchronizing the phase-aligned transferred resampled predicted channel response signal with the servo signals based on the domain-boundary-crossing delay comprises adding to the domain-boundary-crossing delay an additional delay; and a sum of the domain-boundary-crossing delay and the additional delay is equal to a sum of transit time of the write signals to a point where the interference is caused and transit time of the servo signals after the interference is caused to a point where the subtracting occurs.

7. The method of claim 6 wherein adding to the domain-boundary-crossing delay an additional delay comprises adding an additional delay equal to a non-integral number of clock periods.

8. The method of claim 7 wherein adding an additional delay equal to a non-integral number of clock periods comprises separately adding an integral number of clock periods and a phase adjustment.

9. The method of claim 8 wherein adding an integral number of clock periods comprises adding a number of pipeline stages.

10. The method of claim 8 wherein adding a phase adjustment comprises interpolating the phase.

11. A controller for a storage device including a rotatable storage medium on which servo data is written to control read/write head positioning, the controller comprising:

control circuitry for cancelling, from servo signals read in a read channel while a write channel is active, interference caused by write signals in the write channel, the control circuitry including:

a reconstruction filter configured to generate a predicted channel response signal from the write signals in a data clock domain;

a resample circuit configured to resample the generated predicted channel response signal using a clock in the data clock domain having a rate corresponding to a servo clock from a servo clock domain;

transfer circuitry configured to transfer the resampled predicted channel response signal from the data clock domain to the servo clock domain and to align phase of the transferred resampled predicted channel response signal with phase of the servo clock;

clock domain synchronization circuitry configured to determine a domain-boundary-crossing delay incurred in the transfer circuitry;

variable delay circuitry configured to, based on the domain-boundary-crossing delay, synchronize the phase-aligned transferred resampled predicted channel response signal with the servo signals; and combining circuitry configured to subtract the synchronized phase-aligned transferred resampled predicted channel response signal from the servo signals.

12. The controller of claim 11 wherein the resample circuit is configured to start resampling based on a start signal on a rising edge of a data clock of the data clock domain.

13. The controller of claim 12 wherein the transfer circuitry comprises a buffer into which the resampled predicted channel response signal is clocked using the data clock and out of which the resampled predicted channel response signal is clocked using the servo clock.

14. The controller of claim 13 wherein the buffer comprises a FIFO buffer.

15. The controller of claim 12 wherein the clock domain synchronization circuitry is configured to:

pass the start signal through domain-boundary-crossing synchronization circuitry; and measure elapsed time between a rising edge of the start signal immediately prior to the domain-boundary-crossing synchronization circuitry and a rising edge of the start signal immediately following the domain-boundary-crossing synchronization circuitry.

16. The controller of claim 11 wherein the variable delay circuitry is configured to add to the domain-boundary-crossing delay an additional delay, a sum of the domain-boundary-crossing delay and the additional delay being equal to a sum of transit time of the write signals to a point where the interference is caused and transit time of the servo signals after the interference is caused to the combining circuitry.

17. The controller of claim 16 wherein the variable delay circuitry is configured to add to the domain-boundary-crossing delay an additional delay equal to a non-integral number of clock periods.

18. The controller of claim 17 wherein the variable delay circuitry is configured to add to the domain-boundary-crossing delay an additional delay equal to an integral number of clock periods and a phase adjustment.

19. The controller of claim 18 wherein the variable delay circuitry is configured to add an integral number of clock periods by adding a number of pipeline stages.

20. The controller of claim 18 wherein the variable delay circuitry is configured to add a phase adjustment by interpolating the phase.

* * * * *